United States Patent [19]

Sipple

[11] 3,911,405

[45] Oct. 7, 1975

[54] GENERAL PURPOSE EDIT UNIT

[75] Inventor: Ralph E. Sipple, Shoreview, Minn.

[73] Assignee: Sperry Rand Corporation, New York, N.Y.

[22] Filed: Mar. 20, 1974

[21] Appl. No.: 452,899

[52] U.S. Cl. .......................................... 340/172.5

[51] Int. Cl.$^{2}$ ...................... G06F 5/00; G06F 13/00

[58] Field of Search .......... 340/172.5; 235/156, 152

[56] References Cited

UNITED STATES PATENTS

| | | | |
|---|---|---|---|
| 2,969,913 | 1/1961 | Cherin et al. | 235/157 |
| 3,371,320 | 2/1968 | Lachenmayer | 340/172.5 |
| 3,389,379 | 6/1968 | Erickson et al. | 340/172.5 |
| 3,634,882 | 1/1972 | McIlroy | 340/172.5 |

*Primary Examiner*—Gareth D. Shaw
*Assistant Examiner*—Michael C. Sachs
*Attorney, Agent, or Firm*—Thomas J. Nikolai; Kenneth T. Grace; Marshall M. Truex

[57] ABSTRACT

A digital logic network for implementing an edit function so that a field comprising a contiguous group of bits in a source register can be moved to a different location in a destination register without disturbing any of the other bits in the destination register, except those into which the field is transferred. A source register is coupled to a destination register by means of a shift matrix which also receives as a control input a shift count computed by subtracting the bit address in the source register of the first bit in the field to be relocated from the bit address of the first bit in the destination register where the field is to be moved. The bit address in the destination register of the first and last bits of the field to be moved are translated and used to enable gates disposed between the shift matrix output and the destination register such that only those gates associated with stages at or between the first and last bit address in the destination register will be fully enabled.

6 Claims, 8 Drawing Figures

GENERAL PURPOSE EDIT UNIT

BACKGROUND OF THE INVENTION

This invention relates generally to digital data processing apparatus and more specifically to the hardware implementation of a general purpose edit unit for use in such apparatus.

In digital computing apparatus it is often desired to edit a digital word by selecting an arbitrary contiguous field in that word and moving it to a different arbitrary position in a second word.

Prior art solutions to the edit problem have involved somewhat cumbersome and slow manipulations requiring the execution of numerous separate instructions. For example, assume that a computer has a word length of 36 bits and that it is desired to replace bits 7 through 12 in a destination register with bits 20 through 25 of a source register, leaving the remaining bits in the destination register unchanged. The typical prior art approach would be to execute a first instruction to right shift bits 0 through 6 into a first temporary holding register and to execute a second instruction to left shift bits 26 through 35 into a second holding register. Next, a third shifting instruction would be executed to align bits 7 through 12 of the source register with bit positions 20 through 25 of the destination register. Then, a mask instruction would be executed such that all stages of the destination register are ANDed with a mask such that the field in the destination register where the information field is ultimately to be placed is cleared to zeros. A fifth instruction is then used to either add or logically OR the output of the shift instruction with the prepared destination. It can be seen that this prior art approach requires three separate shift instructions, a mask instruction followed by gating through instruction.

By including in the processor the hardware of the present invention, one is able to perform this same edit function through the execution of a single instruction. In implementing the invention, the source register is coupled to the destination register by means of a $n$-bit right circular shift matrix which receives as its control input, a shift count equal to the displacement between the source field and the destination field. Also included is a set of translators which operate upon the bit addresses corresponding to the first and last bits in the segment of the destination register where the source field is to be deposited. The outputs from the translators are applied to a logic array which generates enables for gates associated with the destination register such that the output from the shift matrix is deposited in the desired destination field without affecting the other bits of the destination register. The single edit instruction needed to affect the desired result is thus comprised of a function code and a plurality of parameter fields which define the displacement as well as the beginning and ending bit addresses for the destination stages to be altered. Once this edit instruction is loaded into the instruction register of the computer, the desired edit function is accomplished totally within the arithmetic section of the computer without any further need for memory references to obtain additional instructions such as is the case with known prior art approaches.

OBJECTS

It is accordingly the principle object of the present invention to provide a novel edit instruction for a digital computing device.

Another object of the invention is to provide a hardware mechanization which permits an edit function to be accomplished in response to the execution of only a single instruction.

Still another object of the invention is to provide a novel combination of standard digital computer networks cooperating together to allow a field of arbitrary size and location in a source register to be transferred to a field of the same size but at an arbitrary location in a second register during a single instruction cycle.

DESCRIPTION OF THE FIGURES

These and other objects and features of the invention will be more fully understood and appreciated upon consideration of the following description thereof taken with reference to the accompanying drawings wherein.

DESCRIPTION OF THE PREFERRED EMBODIMENT

Figure 1:
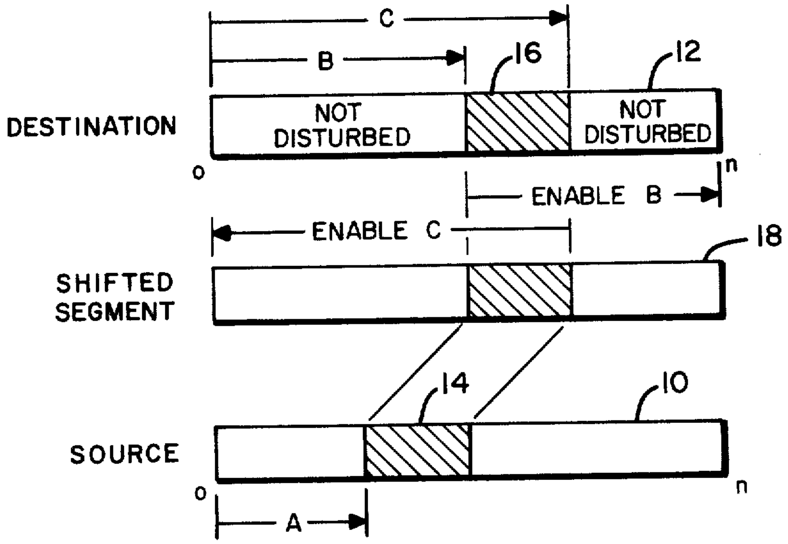
FIG. 1 is a diagrammatic representation of the method employed for performing the edit function useful in defining the parameters of the edit instruction word.

Referring now to FIG. 1, there is shown a rectangle 10 representing $n$-stage digit storage register adapted to store in the individual stages thereof representations of the binary digits 1 or 0. Similarly, rectangle 12 represents a second $n$-stage register. Register 10 may be termed the "source" register while register 12 may be termed the "destination" register. In performing the edit function, it is desired to select a field of arbitrary size, such as the field represented by the cross-hatching 14 in the source register, and transfer this field to an arbitrary position in the destination register 12, such as the position represented by the cross-hatched segment 16.

In order to facilitate the description of the method of editing of the present invention, the following designation is made to the bits in the field of bits to be edited:

$A$ = bit address of least significant bit in field to be moved $B$ = bit address of least significant bit in destination field $C$ = bit address of most significant bit in destination field.

The method of performing the edit function includes the steps of shifting the desired field of bits by means of a shift register or a shift matrix to align the selected field with the intended location in the destination register. This operation is shown schematically in FIG. 1 by means of rectangle 18. Following the shifting operation, enable signals termed "Enable B" and "Enable C" are generated and applied to gates (not shown in FIG. 1) disposed between the output of the shift device and the destination register. The Enable B signals partially enable all gates associated with stages for register bit positions at and above the address "B". Similarly, the Enable C signals partially enable the gates associated with those stages at and below the address "C". The gates on the destination register are such that only those bit positions which have both an Enable B and an Enable C signal present can pass the data from the shift matrix to the destination register. The gates associated with the stages other than those receiving both enables will not be satisfied and, hence, the contents of the destination register at locations other than the destination field will not be disturbed.

Figure 2:
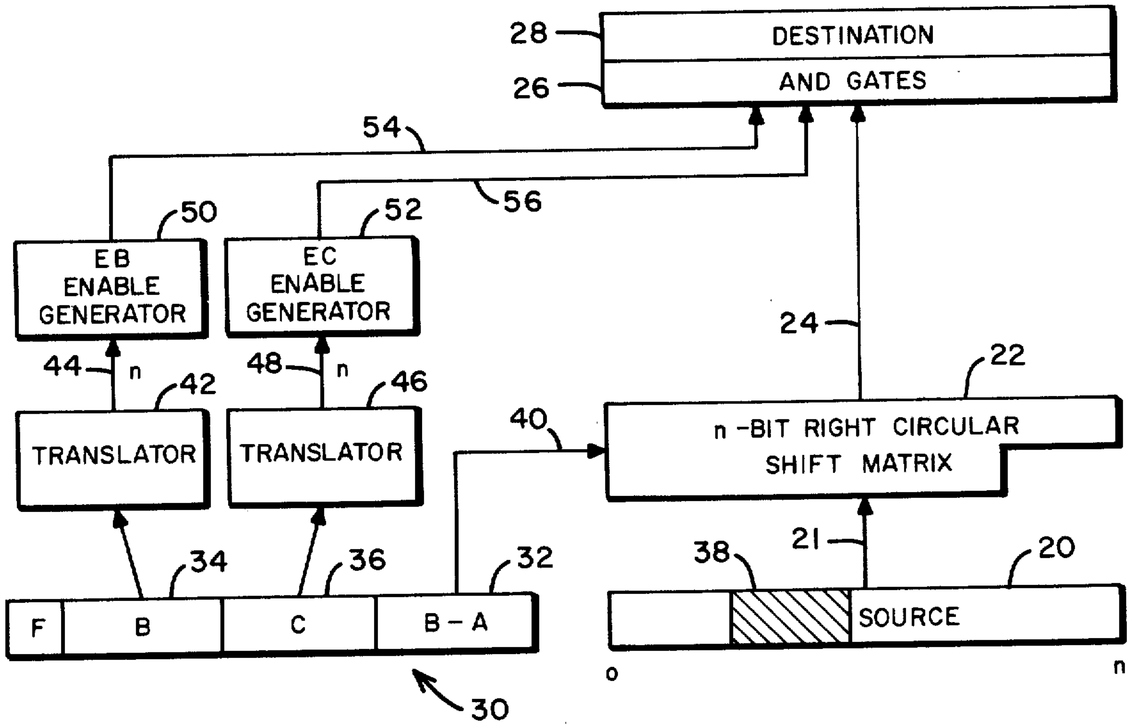
FIG. 2 is a block diagram representation of the hardware used to implement the edit instruction.

In FIG. 2 there is shown the hardware used to implement the edit instruction. In this figure there is shown a source register 20 adapted to temporarily store an $n$-bit operand. The output of the individual stages of the source register are applied via cable 21 as inputs to an $n$-bit right circular shift matrix 22. As is well known in the art, an $n$-bit circular shift matrix is a device which will shift an $n$-bit word by $m$ places where $m$ is any number in the set 0, 1 . . . $n$. An example of one such shift matrix is disclosed in the Newhouse, et al. U.S. Pat. No. 3,076,181. While the Newhouse patent illustrates a shift matrix implemented with magnetic core elements, it is to be understood that various other components including diodes, transistors and integrated circuit chips are available for implementing a shift matrix.

The output from the shift matrix 22 is coupled by way of the lines in cable 24 to a set of AND gates 26 which are individually associated with the $n$-stages of the destination register 28.

Located in the lower left hand portion of FIG. 2 is an instruction register 30 comprised of a plurality of parameter fields 32, 34 and 36. The bits in field 32 represent the quantity (B − A) which, from the definition given above, can be seen to be the displacement, i.e., the distance that the arbitrarily sized field 38 in the source register 20 is to be moved before being inserted in the destination register 28. Thus, it can be seen that the number stored in field 32 of the instruction register 30 comprises a shift count and, as such, the bits thereof are coupled by a cable 40 to the control input of the shift matrix 22.

The number of bits in fields 34 and 36 is determined by the value, n, i.e., the capacity of the source and destination registers. For example, if the source and destination registers are 64-bits in length, the B-Field 34, the B − A Field 32 and the C-Field 36 would each be 6-bits, since $2^6 = 64$.

The bits comprising the B-Field 34 are applied to a translator 42 having n output lines. Therefore, depending upon the bit permutations of the B-Field any one of n output lines in the cable 44 will be energized. In a similar fashion the bits in the C-Field 36 are applied to a translator 46 such that the address represented by the bits of the C-Field of the instruction register are fanned out to $n$ lines so that one of these n lines will be active for each of the possible combinations of the number stored in the C-Field 36.

The $n$ output lines from the translator 42 are connected to the EB Enable Generator 50 while the n output lines from translator 46 are coupled as inputs to the EC Enable Generator 52. As will be fully explained hereinbelow, the Enable Generators 50 and 52 comprise an array of logical OR circuits. Depending upon the bit permutations of the B-Field 34, the output from the EB Enable Generator 50 appearing on the $n$ lines in the cable 54 will be such that enable signals will be applied to the gates 26 for all bit positions at and above the address "B" (see FIG. 1). Similarly, depending upon the bit permutations of the C-Field 36 the output on the n lines in cable 56 emanating from the EC Enable Generator 52 will be such that an enable signal will be applied to the gates 26 associated with all stages in the register 28 at and below the address "C" which is defined as shown in FIG. 1. Only those gates which have both an Enable B and an Enable C signal applied to them will be fully enabled so as to pass the data from the shift matrix 22 to the destination register 28. All other gates will only be partially enabled and will therefore be precluded from passing the shift register output to the stages in the destination register.

Figure 3:
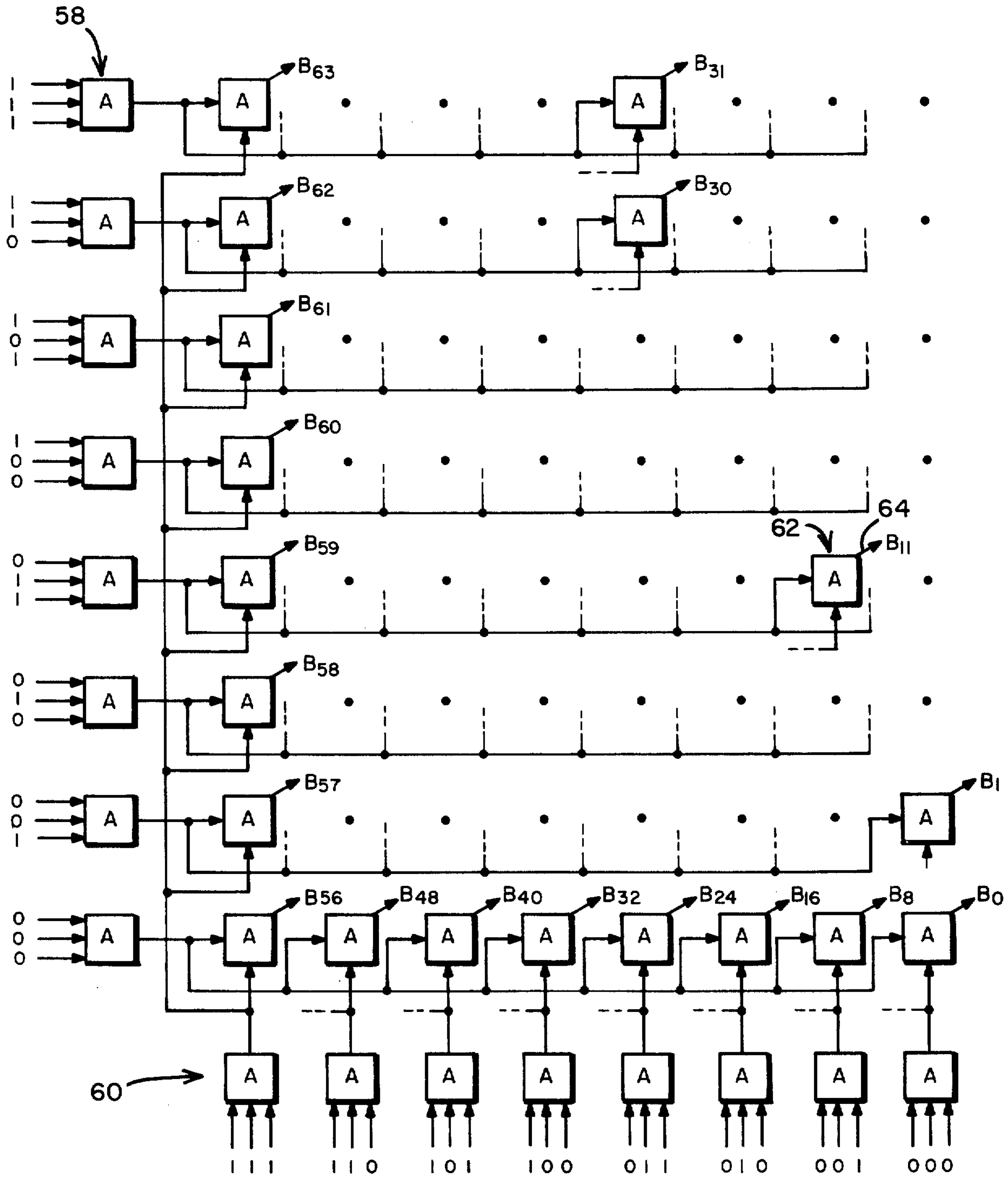
FIG. 3 is a logic diagram of the translator networks of FIG. 2.

FIG. 3 illustrates by means of a logic diagram a network suitable for implementing the translator devices 42 and 46 in FIG. 2. For purposes of illustration only, the translator network of FIG. 3 is designed with the assumption made that the source register and the destination register are each 64-bits in length such that the fields 34 and 36 in the instruction register 30 each comprise 6-bits. Of course, if the source and destination registers are of a different capacity, the translator network of FIG. 3 would be modified accordingly. As is illustrated in FIG. 3, the translator comprises a column of AND gates indicated generally by the numeral 58 and a row of similar AND gates indicated generally by numeral 60. Each of the AND gates in column 58 and row 60 have three inputs. The inputs to the AND gates in column 58 may represent the upper three bits of either the B or the C-Fields while the inputs to the gates in row 60 may be the lower three bits of the B or C-Fields. As such, the upper three bits of the B or C-Fields are decoded by the AND gates 58 to 1 of 8 while the three lower bits of the B or C-Fields are decoded by the gates in row 60 to 1 of 8. Located at the intersection of each of the eight rows and eight columns is another AND gate connected to receive as inputs the outputs from one of the AND gates in rows 58 and 60. While for purposes of illustration and for the sake of simplicity, only a few of these second order AND gates are illustrated, it is to be understood that in the actual circuit, there would be 64 such AND gates such that for any particular combination of the 6-bits comprising the B or C-Fields, only one of the 64 possible output lines from the second order AND gates will be energized. For example, if the B-Field or C-Field happens to be 011001, it will be gate 62 and only gate 62 which will be fully enabled to produce a signal on output conductor 64. Thus, the apparatus of FIG. 3 operates to decode the bit permutations of the B and C-Fields to uniquely select one and only one of the 64 output lines emanating from the translator of FIG. 3.

Figure 4:
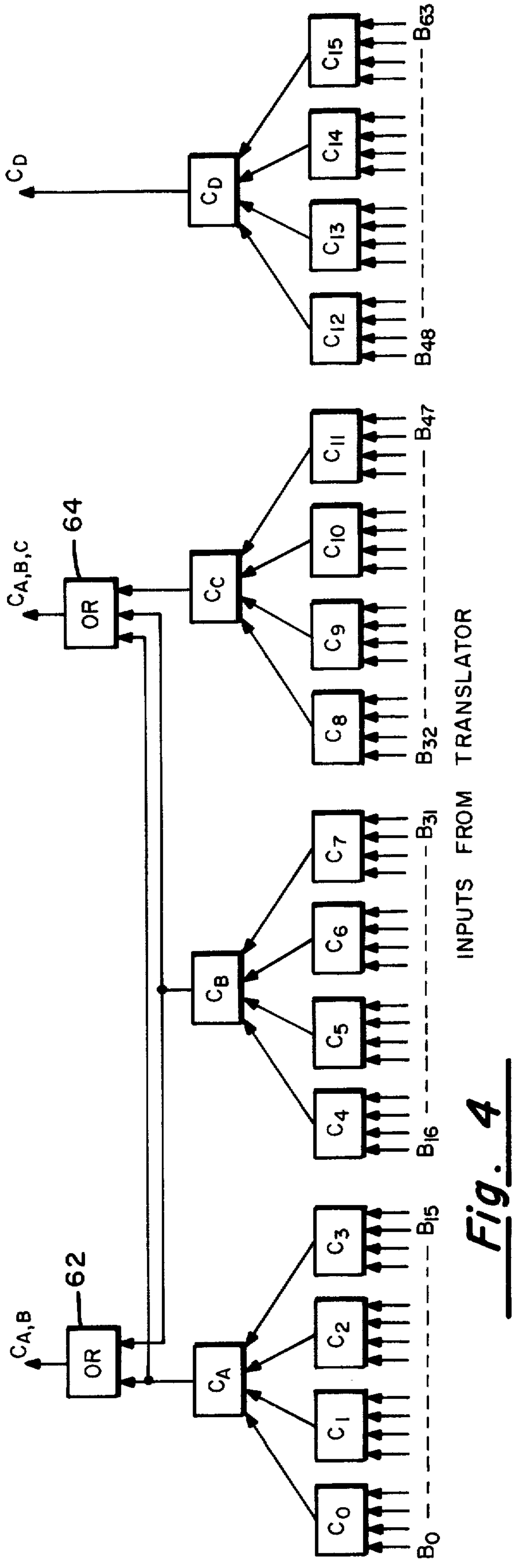
FIG. 4 represents by means of a block diagram a portion of the circuitry for implementing the enable generator networks of FIG. 2.
Figure 5:
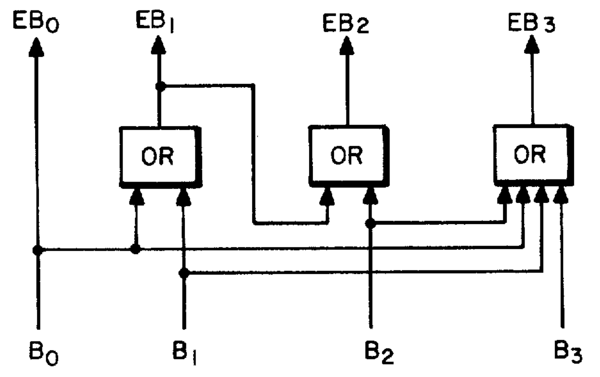
FIG. 5 illustrates circuitry for generating enable signals for the gates associated with stages 0 through 3 of the destination register.
Figure 6:
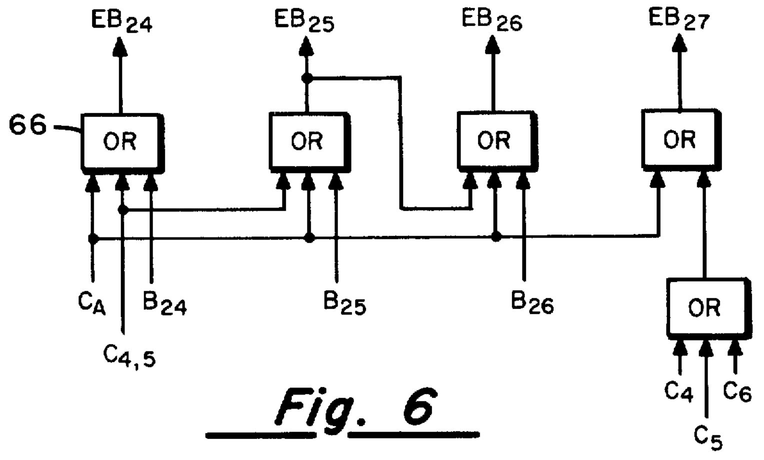
FIG. 6 illustrates circuitry for generating enables for the gates associated with stages 24 through 27 of the destination register.

FIGS. 4, 5 and 6 illustrate portions of the logic circuitry used to implement the EB Enable Generator 50 in FIG. 2. In each of these Figures, the rectangular boxes represent logical OR circuits. No other logic element is required. In FIG. 4, the logical OR circuits labeled $C_0$ through $C_{15}$ receive as inputs the 64 outputs from the translator network of FIG. 3. As has already been mentioned, during the execution of an edit instruction, only one of the inputs in the set $B_0 \ldots B_{63}$ will be active at any given time.

The output from OR circuits $C_0$ – $C_3$ are connected as inputs to OR circuit $C_A$ such that if any one of the lines $B_0$ – $B_{15}$ are active, OR circuit $C_A$ will produce an output to OR circuits 62 and 64. Similarly, if any one of the inputs $B_{16}$ through $B_{31}$ is active, one of the OR circuits $C_4$, $C_5$, $C_6$ or $C_7$ will produce an output to OR circuit $C_B$ which, in turn, is applied as an input to OR circuits 62 and 64.

Figure 7:
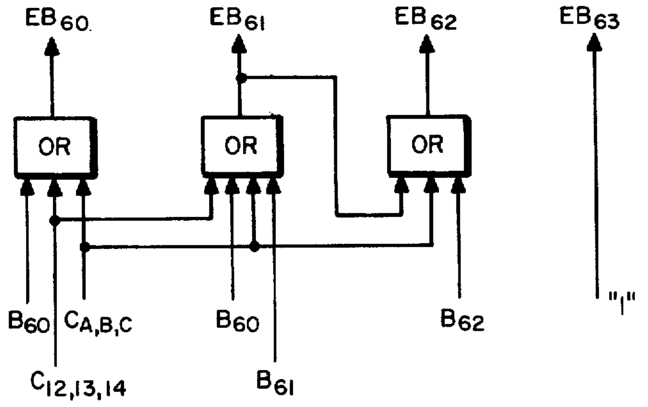
FIG. 7 illustrates the circuitry for generating enables for the gates associated with stages 60 through 63 of the destination register.

FIGS. 5, 6 and 7 illustrate the logic for generating the enable B signals $EB_0$ through $EB_3$, $EB_{24}$ through $EB_{27}$ and $EB_{60}$ through $EB_{63}$ by utilizing various signals developed in the logic circuitry of FIG. 4. For example, referring to FIG. 6, the B Enable signal for stage 24 appears at the output of OR circuit 66 when either OR circuit $C_A$ in FIG. 4 is active or when either OR circuit $C_4$ or $C_5$ in FIG. 4 is active or when the output line $B_{24}$ of the translator of FIG. 3 is active. As another example, by referring to FIG. 7, it can be seen that the B Enable for the gate associated with stage 60 will be active if OR circuit 64 in FIG. 4 is activated or if line $B_{60}$ in the translator of FIG. 3 is active or if either OR circuits $C_{12}$, $C_{13}$ or $C_{14}$ in FIG. 4 is receiving an active output from the translator of FIG. 3.

Rather than illustrate by means of drawings the logic block diagram for the EB Enable Generator 50, there is set forth in the following Tables I, II and II(A) the Boolean logic equations for this Enable Generator. One having any familiarity with the design of digital switching circuits should have no difficulty in constructing the EB Enable Generator from these equations, especially when the exemplary logic circuitry of FIGS. 4 – 7 is presented.

TABLE I

EQUATIONS FOR EB ENABLE GENERATOR

| | |
|---|---|
| $C_0=B_0+B_1+B_2+B_3$ | $C_8=B_{32}+B_{33}+B_{34}+B_{35}$ |
| $C_1=B_4+B_5+B_6+B_7$ | $C_9=B_{36}+B_{37}+B_{38}+B_{39}$ |
| $C_2=B_8+B_9+B_{10}+B_{11}$ | $C_{10}=B_{40}+B_{41}+B_{42}+B_{43}$ |
| $C_3=B_{12}+B_{13}+B_{14}+B_{15}$ | $C_{11}=B_{44}+B_{45}+B_{46}+B_{47}$ |
| $C_4=B_{16}+B_{17}+B_{18}+B_{19}$ | $C_{12}=B_{48}+B_{49}+B_{50}+B_{51}$ |
| $C_5=B_{20}+B_{21}+B_{22}+B_{23}$ | $C_{13}=B_{52}+B_{53}+B_{54}+B_{55}$ |
| $C_6=B_{24}+B_{25}+B_{26}+B_{27}$ | $C_{14}=B_{56}+B_{57}+B_{58}+B_{59}$ |
| $C_7=B_{28}+B_{29}+B_{30}+B_{31}$ | $C_{15}=B_{60}+B_{61}+B_{62}+B_{63}$ |
| $C_A=C_0+C_1+C_2+C_3$ | $C_{AB}=C_A+C_B$ |
| $C_B=C_4+C_5+C_6+C_7$ | $C_{ABC}=C_A+C_B+C_C$ |
| $C_C=C_8+C_9+C_{10}+C_{11}$ | |
| $C_D=C_{12}+C_{13}+C_{14}+C_{15}$ | |
| $C_{0,1}=C_0+C_1$ | $C_{8,9}=C_8+C_9$ |
| $C_{0,1,2}=C_0+C_1+C_2$ | $C_{8,9,10}=C_8+C_9+C_{10}$ |
| $C_{4,5}=C_4+C_5$ | $C_{12,13}=C_{12}+C_{13}$ |
| $C_{4,5,6}=C_4+C_5+C_6$ | $C_{12,13,14}=C_{12}+C_{13}+C_{14}$ |

TABLE II

EQUATIONS FOR EB ENABLE GENERATOR

| | |
|---|---|
| $EB_0=B_0$ | $EB_{16}=C_A+B_{16}$ |

TABLE II-Continued

EQUATIONS FOR EB ENABLE GENERATOR

| | |
|---|---|
| $EB_1=B_0+B_1$ | $EB_{17}=C_A+B_{16}+B_{17}$ |
| $EB_2=EB_1+B_2$ | $EB_{18}=C_A+EB_{17}+B_{18}$ |
| $EB_3=C_0$ | $EB_{19}=C_A+C_4$ |
| $EB_4=C_0+B_4$ | $EB_{20}=C_A+C_4+B_{20}$ |
| $EB_5=C_0+B_4+B_5$ | $EB_{21}=C_A+C_4+B_{20}+B_{21}$ |
| $EB_6=EB_5+B_6$ | $EB_{22}=C_A+EB_{21}+B_{22}$ |
| $EB_7=C_{0,1}$ | $EB_{23}=C_A+C_{4,5}$ |
| $EB_8=C_{0,1}+B_8$ | $EB_{24}=C_A+C_{4,5}+B_{24}$ |
| $EB_9=C_{0,1}+B_8+B_9$ | $EB_{25}=C_A+C_{4,5}+B_{24}+B_{25}$ |
| $EB_{10}=EB_9+B_{10}$ | $EB_{26}=C_A+EB_{25}+B_{26}$ |
| $EB_{11}=C_{0,1,2}$ | $EB_{27}=C_A+C_{4,5,6}$ |
| $EB_{12}=C_{0,1,2}+B_{12}$ | $EB_{28}=C_A+C_{4,5,6}+B_{28}$ |
| $EB_{13}=C_{0,1,2}+B_{12}+B_{13}$ | $EB_{29}=C_A+C_{4,5,6}+B_{28}+B_{29}$ |
| $EB_{14}=EB_{13}+B_{14}$ | $EB_{30}=C_A+EB_{29}+B_{30}$ |
| $EB_{15}=C_A$ | $EB_{31}=C_{AB}$ |

TABLE II (A)

EQUATIONS FOR EB ENABLE GENERATOR

| | |
|---|---|
| $EB_{32}=C_{AB}+B_{32}$ | $EB_{48}=C_{ABC}+B_{48}$ |
| $EB_{33}=C_{AB}+B_{32}+B_{33}$ | $EB_{49}=C_{ABC}+B_{48}+B_{49}$ |
| $EB_{34}=C_{AB}+EB_{33}B_{34}$ | $EB_{50}=C_{ABC}+EB_{49}+B_{50}$ |
| $EB_{35}=C_{AB}+C_8$ | $EB_{51}=C_{ABC}+C_{12}$ |
| $EB_{36}=C_{AB}+C_8+B_{36}$ | $EB_{52}=C_{ABC}+C_{12}+B_{52}$ |
| $EB_{37}=C_{AB}+C_8+B_{36}+B_{37}$ | $EB_{53}=C_{ABC}+C_{12}+B_{52}+B_{53}$ |
| $EB_{38}=C_{AB}+EB_{37}+B_{38}$ | $EB_{54}=C_{ABC}+EB_{53}+B_{54}$ |
| $EB_{39}=C_{AB}+C_{8,9}$ | $EB_{55}=C_{ABC}+C_{12,13}$ |
| $EB_{40}=C_{AB}+C_{8,9}+B_{40}$ | $EB_{56}=C_{ABC}+C_{12,13}+B_{56}$ |
| $EB_{41}=C_{AB}+C_{8,9}+B_{40}+B_{41}$ | $EB_{57}=C_{ABC}+C_{12,13}+B_{56}+B_{57}$ |
| $EB_{42}=C_{AB}+EB_{41}+B_{42}$ | $EB_{58}=C_{ABC}+C_{12,13}+EB_{57}+B_{58}$ |
| $EB_{43}=C_{AB}+C_{8,9,10}$ | $EB_{59}=C_{ABC}+C_{12,13,14}$ |
| $EB_{44}=C_{AB}+C_{8,9,10}+B_{44}$ | $EB_{60}=C_{ABC}+C_{12,13,14}+B_{60}$ |
| $EB_{45}=C_{AB}+C_{8,9,10,}+B_{44}+B_{45}$ | $EB_{61}=C_{ABC}+C_{12,13,14}+B_{60}-B_{61}$ |
| $EB_{46}=C_{AB}+EB_{45}+B_{46}$ | $EB_{62}=C_{ABC}+EB_{61}+B_{62}$ |
| $EB_{47}=C_{ABC}$ | $EB_{63}=1$ |

Figure 8:
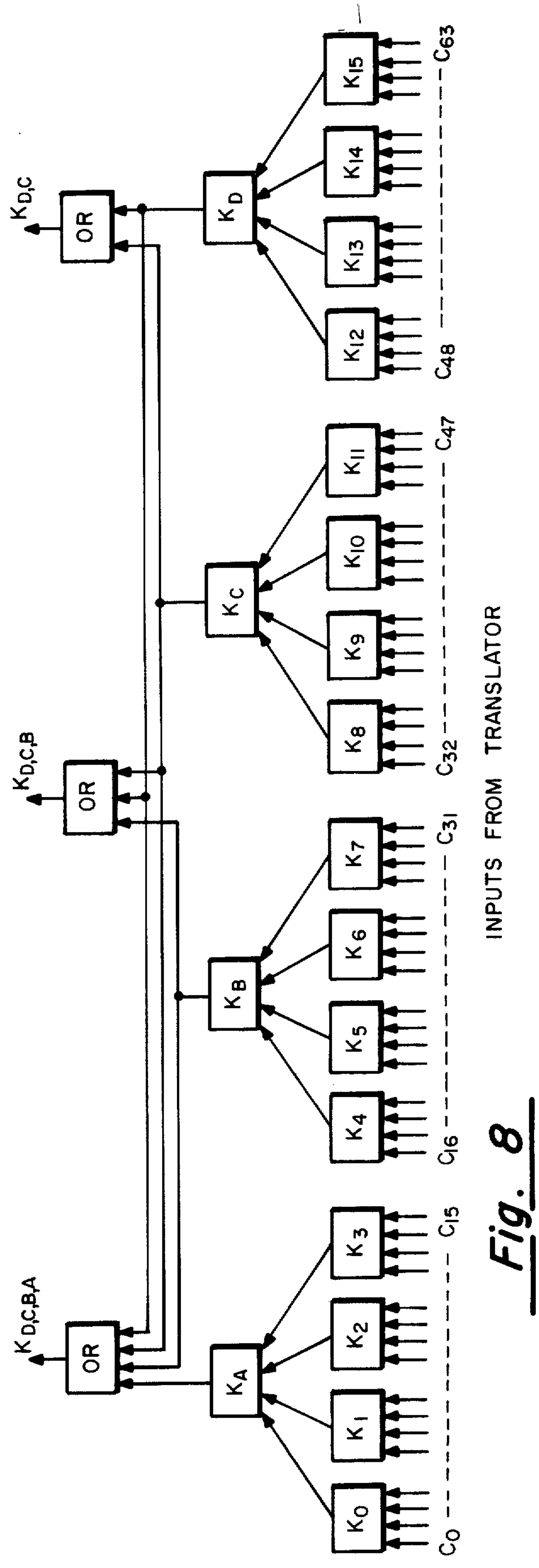
FIG. 8 shows a portion of the logic circuitry for the Enable C generator of FIG. 2.

The Enable C signals ($EC_0$ through $EC_{63}$) developed by the EC Enable Generator 52 can also be most easily expressed by means of Boolean equations. FIG. 8 illustrates a portion of the circuitry included within the generator 52 and is included to provide a definitional basis for certain of the intermediate terms used in the following Tables III, IV and IV(A). As is shown, the 64 output lines from the C-Field translator 46 (which may be identical to that of FIG. 3) are applied in groups of four to sixteen logical OR circuits labeled $K_0$ through $K_{15}$. Only one such input will be active, i.e., in the logical "1" state, at any given time as determined by the bit permutations of the C-Field 36. The outputs from OR circuits $K_0$ through $K_3$ are connected as inputs to a further OR circuit, $K_A$, and likewise the outputs from the remaining OR circuits $K_4$ through $K_{15}$ are connected in groups of four to the OR circuits $K_B$, $K_C$ and $K_D$. The partial results $K_{DC}$, $K_{DCB}$ and $K_{DCBA}$ are formed by ORing together the outputs from circuits $K_A$, $K_B$, $K_C$ and $K_D$ as illustrated.

When the enables $EB_j$ and $EC_j$ ($j = 0, 1 \ldots n$) set out in the Tables I – IV(A) are applied to the individual AND gates associated with the destination register along with the outputs from the shift device, only those stages of the destination register which are at and above the address "B" and at and below the address "C" will have the shift matrix output entered therein. All other stages not meeting the foregoing criteria will not have their contents altered.

TABLE III

EQUATIONS FOR EC ENABLE GENERATOR

| | |
|---|---|
| $K_0=C_0+C_1+C_2+C_3$ | $K_8=C_{32}+C_{33}+C_{34}+C_{35}$ |
| $K_1=C_4+C_5+C_6+C_7$ | $K_9=C_{36}+C_{37}+C_{38}+C_{39}$ |
| $K_2=C_8+C_9+C_{10}+C_{11}$ | $K_{10}=C_{40}+C_{41}+C_{42}+C_{43}$ |
| $K_3=C_{12}+C_{13}+C_{14}+C_{15}$ | $K_{11}=C_{44}+C_{45}+C_{46}+C_{47}$ |
| $K_4=C_{16}+C_{17}+C_{18}+C_{19}$ | $K_{12}=C_{48}+C_{49}+C_{50}+C_{51}$ |
| $K_5=C_{20}+C_{21}+C_{22}+C_{23}$ | $K_{13}=C_{52}+C_{53}+C_{54}+C_{55}$ |
| $K_6=C_{24}+C_{25}+C_{26}+C_{27}$ | $K_{14}=C_{56}+C_{57}+C_{58}+C_{59}$ |
| $K_7=C_{28}+C_{29}+C_{30}+C_{31}$ | $K_{15}=C_{60}+C_{61}+C_{62}+C_{63}$ |
| $K_A=K_0+K_1+K_2+K_3$ | $K_{DC}=K_D+K_C$ |
| $K_B=K_4+K_5+K_6+K_7$ | $K_{DCB}=K_D+K_C+K_B$ |
| $K_C=K_8+K_9+K_{10}+K_{11}$ | $K_{DCBA}=K_D+K_C+K_B+K_A$ |
| $K_D=K_{12}+K_{13}+K_{14}+K_{15}$ | |
| $K_{15,14}=K_{15}+K_{14}$ | $K_{3,2}=K_3+K_2$ |
| $K_{15,14,13}=K_{15}+K_{14}+K_{13}$ | $K_{3,2,1}=K_3+K_2+K_1$ |
| $K_{7,6}=K_7+K_6$ | $K_{11,10}=K_{11}+K_{10}$ |
| $K_{7,6,5}=K_7+K_6+K_5$ | $K_{11,10,9}=K_{11}+K_{10}+K_9$ |

TABLE IV

EQUATIONS FOR EC ENABLE GENERATOR

| | |
|---|---|
| $EC_0=1$ | $EC_{16}=K_{DCB}$ |
| $EC_1=K_{DCB}+EC_2+C_1$ | $EC_{17}=K_{DC}+EC_{18}+C_{17}$ |
| $EC_2=K_{DCB}+K_{3,2,1}+C_3+C_2$ | $EC_{18}=K_{DC}+K_{7,6,5}+C_{19}+C_{18}$ |
| $EC_3=K_{DCB}+K_{3,2,1}+C_3$ | $EC_{19}=K_{DC}+K_{7,6,5}+C_{19}$ |
| $EC_4=K_{DCB}+K_{3,2,1}$ | $EC_{20}=K_{DC}+K_{7,6,5}$ |
| $EC_5=K_{DCB}+EC_6+C_5$ | $EC_{21}=K_{DC}+EC_{22}+C_{21}$ |
| $EC_6=K_{DCB}+K_{3,2}+C_7+C_6$ | $EC_{22}=K_{DC}+K_{7,6}+C_{23}+C_{22}$ |
| $EC_7=D_{DCB}+K_{3,2}+C_7$ | $EC_{23}=K_{DC}+K_{7,6}+C_{23}$ |
| $EC_8=K_{DCB}+K_{3,2}$ | $EC_{24}=K_{DC}+K_{7,6}$ |
| $EC_9=K_{DCB}+EC_{10}+C_9$ | $EC_{25}=K_{DC}+EC_{26}+C_{25}$ |
| $EC_{10}=K_{DCB}+K_3+C_{11}+C_{10}$ | $EC_{26}=K_{DC}+K_7+C_{27}+C_{26}$ |
| $EC_{11}=K_{DCB}+K_3+C_{11}$ | $EC_{27}=K_{DC}$ 30 $K_7+C_{27}$ |
| $EC_{12}=K_{DCB}+K_3$ | $EC_{28}=K_{DC}+K_7$ |
| $EC_{13}=K_{DCB}+EC_{14}+C_{13}$ | $EC_{29}=K_{DC}+EC_{30}+C_{29}$ |
| $EC_{14}=K_{DCB}+C_{15}+C_{14}$ | $EC_{30}=K_{DC}+C_{31}+C_{30}$ |
| $EC_{15}=K_{DCB}+C_{15}$ | $EC_{31}=K_{DC}+C_{31}$ |

TABLE IV(A)

EQUATIONS FOR EC ENABLE GENERATOR

| | |
|---|---|
| $EC_{32}=K_{DC}$ | $EC_{48}=K_D$ |
| $EC_{33}=K_D+EC_{34}+C_{33}$ | $EC_{49}=K_{15,14,13}+EC_{50}+C_{49}$ |
| $EC_{34}=K_D+K_{11,10,9}+C_{35}+C_{34}$ | $EC_{50}=K_{15,14,13}+C_{51}+C_{50}$ |
| $EC_{35}=K_D+K_{11,10,9}+C_{35}$ | $EC_{51}=K_{15,14,13}+C_{51}$ |
| $EC_{36}=K_D+K_{11,10,9}$ | $EC_{52}=K_{15,14,13}$ |
| $EC_{37}=K_D+EC_{38}+C_{37}$ | $EC_{53}=K_{15,14}+EC_{54}+C_{53}$ |
| $EC_{38}=K_D+K_{11,10}+C_{39}+C_{38}$ | $EC_{54}=K_{15,14}+C_{55}+C_{54}$ |
| $EC_{39}=K_D+K_{11,10}+C_{39}$ | $EC_{55}=K_{15,14}+C_{55}$ |
| $EC_{40}=K_D+K_{11,10}$ | $EC_{56}=K_{15,14}$ |
| $EC_{41}=K_D+EC_{42}+C_{41}$ | $EC_{57}=K_{15}+EC_{58}+C_{57}$ |
| $EC_{42}=K_D+K_{11}+C_{43}+C_{42}$ | $EC_{58}=K_{15}+C_{59}+C_{58}$ |
| $EC_{43}=K_D+K_{11}+C_{43}$ | $EC_{59}=K_{15}+C_{59}$ |
| $EC_{44}=K_D+K_{11}$ | $EC_{60}=K_{15}$ |
| $EC_{45}=K_D+EC_{46}+C_{45}$ | $EC_{61}=EC_{62}+C_{61}$ |
| $EC_{46}=K_D+C_{47}+C_{46}$ | $EC_{62}=C_{63}+C_{62}$ |
| $EC_{47}=K_D+C_{47}$ | $EC_{63}=C_{63}$ |

The implementation of the edit unit shown in FIG. 2, using the logic circuitry defined by the equations in Tables I – IV(A) for the Enable Generators 50 and 52 involves only six levels of logic delay including two levels in the translators 42 and 46. That is, from the time that the addresses B and C are valid until the EB's and EC's are valid is only the time it takes for a signal to propagate through six levels of logic circuitry. Using commercially available semiconductor integrated circuits for the AND and OR elements used in the translators and enable generators, the complete edit operation can be accomplished in only 60 nanoseconds using 10 nanoseconds per level. Using state-of-the-art large scale integration (LSI) chips where typical delays of only 2 nanoseconds per level or less are obtainable, the entire process requires only 2 × 6 = 12 nanoseconds. This is to be compared with a time of approximately 3,750 nanoseconds when the prior art method involving three separate shift instructions, a mask instruction and a gating instruction are used.

Where high speed of operation is not the governing design criteria, but instead, economy in circuits is to control, an alternate design may be used without departing from the scope of the invention. For example, assume that instead of having the input parameters A, B and C provided as defined in FIG. 1, that the input parameters are presented as A and B (as previously defined) and FW, the field width of the segment to be edited. The first step is to compute the address of the last bit in the destination field by carrying out the following computation:

$$C = B + FW - 1$$

If B and FW are assumed to be 6-bits in length, which would be the size required if the source and destination registers are $2^6 = 64$-bits in length, the resulting C address will also be six bits in length and may be used in deriving the EC enables as set forth in Tables IV and IV(A). The $EB_0$ through $EB_{63}$ enables are generated in the EB Enable Generator 50 which is structured in accordance with the logic equations set forth in the following Table V and Table V(A).

TABLE V

GENERATION OF EB ENABLES (Alternate Embodiment)

| | |
|---|---|
| $EB_0=B_0$ | $EB_{16}=C_A+B_{16}$ |
| $EB_1=B_0+B_1$ | $EB_{17}=EB_{16}+B_{17}$ |
| $EB_2=EB_1+B_2$ | $EB_{18}=EB_{17}+B_{18}$ |
| $EB_3=EB_2+B_3=C_0$ | $EB_{19}=EB_{18}+B_{19}$ |
| $EB_4=EB_3+B_4$ | $EB_{20}=EB_{19}+B_{20}$ |
| $EB_5=EB_4+B_5$ | $EB_{21}=EB_{20}+B_{21}$ |
| $EB_6=EB_5+B_6$ | $EB_{22}=EB_{21}+B_{22}$ |
| $EB_7=EB_6+B_7=C_0+C_1$ | $EB_{23}=EB_{22}+B_{23}$ |
| $EB_8=EB_7+B_8$ | $EB_{24}=EB_{23}+B_{24}$ |
| $EB_9=EB_8+B_9$ | $EB_{25}=EB_{24}+B_{25}$ |
| $EB_{10}=EB_9+B_{10}$ | $EB_{26}=EB_{25}+B_{26}$ |
| $EB_{11}=EB_{10}+B_{11}=EB_7+C_2$ | $EB_{27}=EB_{26}+B_{27}$ |
| $EB_{12}=EB_{11}+B_{12}$ | $EB_{28}=EB_{27}+B_{28}$ |
| $EB_{13}=EB_{12}+B_{13}$ | $EB_{29}=EB_{28}+B_{29}$ |
| $FB_{14}=EB_{13}+B_{14}$ | $EB_{30}=_{EB29}+B_{30}$ |
| $EB_{15}=C_0+C_1+C_2+C_3=C_A$ | $EB_{31}=C_A+C_B=C_{AB}$ |
| $C_3=B_{12}+B_{13}+B_{14}+B_{15}$ | |

TABLE V(A)

GENERATION OF EB ENABLES (Alternate Embodiment)

| | |
|---|---|
| $EB_{32}=C_{AB}+B_{32}$ | $EB_{48}=C_{ABC}+B_{48}$ |
| $EB_{33}=EB_{32}+B_{33}$ | $EB_{49}=EB_{48}+B_{49}$ |
| $EB_{34}=EB_{33}+B_{34}$ | $EB_{50}=EB_{49}+B_{50}$ |
| $EB_{35}=EB_{34}+B_{35}$ | $EB_{51}=EB_{50}+B_{51}$ |
| $EB_{36}=EB_{35}+B_{36}$ | $EB_{52}=EB_{51}+B_{52}$ |
| $EB_{37}=EB_{36}+B_{37}$ | $EB_{53}=EB_{52}+B_{53}$ |
| $EB_{38}=EB_{37}+B_{38}$ | $EB_{54}=EB_{53}+B_{54}$ |
| $EB_{39}=EB_{38}+B_{39}$ | $EB_{55}=EB_{54}+B_{55}$ |
| $EB_{40}=EB_{39}+B_{40}$ | $EB_{56}=EB_{55}+B_{56}$ |
| $EB_{41}=EB_{40}+B_{41}$ | $EB_{57}=EB_{56}+B_{57}$ |
| $EB_{42}=EB_{41}+B_{42}$ | $EB_{58}=EB_{57}+B_{58}$ |
| $EB_{43}=EB_{42}+B_{43}$ | $EB_{59}=EB_{58}+B_{59}$ |
| $EB_{44}=EB_{43}+B_{44}$ | $EB_{60}=EB_{59}+B_{60}$ |
| $EB_{45}=EB_{44}+B_{45}$ | $EB_{61}=EB_{60}+B_{61}$ |
| $EB_{46}=EB_{45}+B_{46}$ | $EB_{62}=EB_{61}+B_{62}$ |
| $EB_{47}=C_{ABC}$ | $EB_{63}$=Logical "1" |

By examining the above table, it can be seen that the foregoing implementation of the EB Enable Generator 50 requires a total of 63 levels + 2 levels in translator 44. It represents a savings in the number of gates required over the design represented by the equations of Tables I – IV(A), this savings is at the expense of an increased delay time. As was mentioned above, the design represented by the equations of Tables I – IV(A) requires only 4 levels + 2 levels (in the translator) of logic delay whereas that represented by the equations of Tables V and V(A) requires 63. However, even this 63 levels of delay is a significant speedup over prior art editing methods which require the fetching, decoding and execution of multiple instructions. The 63 level version of forming the EB enables is far from optimum, but is shown to illustrate the extreme case. A cost/performance trade can be made to arrive at the proper version for each application.

Although the present invention has been described with a certain degree of particularity, it should be understood that the present disclosure has been made by way of example and that numerous modifications in the way of trade-offs between circuit costs and speed of operation can be made without departing from the spirit and scope of the following claims.

What is claimed is:

1. In a digital data processor, apparatus responsive to the presence of a predetermined instruction word in the instruction register of said processor, said instruction word including a plurality of parameter fields for extracting a field of contiguous bits from any location in a first binary coded word and inserting said field in parallel fashion in a selected location in a second word without affecting any other bits of said second word except in said selected location, comprising in combination:

a. a source register comprising a plurality of bistable stages for storing a first binary coded word;

b. a destination register including a plurality of individual bistable stages adapted to store a second binary coded word;

c. plural gating means individually connected to said plurality of bistable stages of said destination register for entering binary coded information therein when said gating means are enabled;

d. shifting means having input lines and output lines said input lines being connected to said plurality of bistable stages of said source register, said output lines being connected individually to said plural gating means, said shifting means further having a control input adapted to receive a shift count from said instruction register for shifting the contents of said source register a number of bit positions specified by said shift count; and e. enabling means responsive to said plurality of parameter fields of said instruction word contained in the instruction register of said processor, for simultaneously enabling only the gating means corresponding to the individual stages of said destination register which are at and above a first designated bit position specified by a first of said plurality of parameter fields and at and below a second designated bit position specified by a second of said plurality of parameter fields.

2. Apparatus as in claim 1 wherein said enabling means comprises:

a. first and second translator means having their inputs connected to receive said first and second parameter fields of said instruction word for uniquely energizing a single output line from each of said first and second translators as determined by the bit permutation of said first and second parameter fields; and b. first and second enable signal generating means respectively connected to the output lines of said first and second translator means and to said gating means for producing enabling signals for the gating means associated with those stages of said destination register which are at and above said first designated bit position and at and below said second designated bit position.

3. Apparatus as in claim 2 wherein said first enable signal generating means has a plurality of outputs each of which is individually connected to the gating means for said individual stages of said destination register.

4. Apparatus as in claim 3 wherein said first enable signal generating means includes a plurality of logical OR circuits connected to the output lines of said first translator means for providing enable signals to only those gating means associated with stages in said destination register at and above the uniquely energized single output line from said first translator means.

5. Apparatus as in claim 2 wherein said second enable signal generating means includes a plurality of logical OR circuits connected to the output lines of said second translator means for providing enable signals to only those gating means associated with stages in said destination register at and below the uniquely energized single output line from said second translator means.

6. Apparatus as in claim 1 wherein said gating means comprises a plurality of three input AND circuits each having a first input connected to an output from said shift matrix, a second input connected to said first enable signal generating means, a third input connected to said second enable signal generating means and an output connected to an individual stage of said destination register.

* * * * *

UNITED STATES PATENT OFFICE
CERTIFICATE OF CORRECTION

Patent No. 3,911,405 Dated October 7, 1975

Inventor(s) Ralph E. Sipple

It is certified that error appears in the above-identified patent and that said Letters Patent are hereby corrected as shown below:

IN THE PRINTED PATENT:

COLUMN 7, Table IV, right-hand column on line 12, "$EC_{27}=K_{DC}30\ K_7+C_{27}$" should be -- $EC_{27}=K_{DC}+K_7+C_{27}$ -- .

COLUMN 8, Table V, right-hand column on line 15, "$EB_{30}\ \bar{\bar{I}}\ EB29+B_{30}$" should be -- $EB_{30}=EB_{29}+B_{30}$ -- .

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,911,405
DATED : October 7, 1975
INVENTOR(S) : Ralph E. Sipple

It is certified that error appears in the above-identified patent and that said Letters Patent are hereby corrected as shown below:

Column 1 at lines 13 through 38 should be amended as follows:

Prior art solutions to the edit problem have involved somewhat cumbersome and slow manipulations requiring the execution of numerous separate instructions. For example, assume that a computer has a word length of 36 bits and that it is desired to replace bits [7] 20 through [12] 25 in a destination register with bits [20] 7 through [5] 12 of a source register, leaving the remaining bits in the destination register unchanged. The typical prior art approach would be to execute a first instruction to right shift with zero fill bits 0 through 6 of the source register into a first temporary holding register and to execute a second instruction to left shift with zero fill bits [26] 13 through 35 into a second holding register. Next, a third shifting instruction with zero fill would be executed to align bits 7 through 12 of the source register with bits 20 through 25 of the destination register.

UNITED STATES PATENT AND TRADEMARK OFFICE

CERTIFICATE OF CORRECTION

PATENT NO. : 3,911,405
DATED : October 7, 1975
INVENTOR(S) : Ralph E. Sipple

It is certified that error appears in the above-identified patent and that said Letters Patent are hereby corrected as shown below:

Then, a mask instruction would be executed such that all stages of the destination register are ANDed with a mask such that the field in the destination register where the information field is ultimately to be placed is cleared to zeros. A fifth instruction is then used to either add or logically OR the output of the shift instruction with the prepared destination. It can be seen that this prior art approach requires three separate shift instructions, a mask instruction followed by a gating-through instruction.

Signed and Sealed this

*Twenty-eighth* Day of *March 1978*

[SEAL]

*Attest:*

RUTH C. MASON
*Attesting Officer*

LUTRELLE F. PARKER
*Acting Commissioner of Patents and Trademarks*